(12) United States Patent
Liao et al.

(10) Patent No.: US 6,272,104 B1
(45) Date of Patent: Aug. 7, 2001

(54) MEDIA RETENTION DEVICE FOR CD ROM AND DIGITAL VIDEO DRIVES IN A PORTABLE COMPUTER

(75) Inventors: Reynold Liao, Austin; Sean O'Neal, Round Rock; Mark White, Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,628

(22) Filed: Jan. 26, 1999

(51) Int. Cl.⁷ ............................................. G11B 17/028
(52) U.S. Cl. ..................... 369/270; 369/271; 360/99.05
(58) Field of Search .................... 369/270, 271; 360/99.72, 99.04, 99.05

(56) References Cited

U.S. PATENT DOCUMENTS

| | | | |
|---|---|---|---|
| 2,937,916 | * 5/1960 | Hohnecker | 369/270 |
| 3,436,082 | * 4/1969 | Bostrom et al. | 369/270 |
| 4,077,236 | * 3/1978 | Dalziel | 464/61 |
| 4,841,518 | 6/1989 | Nozu et al. | 369/270 |
| 5,014,143 | * 5/1991 | Mori et al. | 360/99.12 |
| 5,050,148 | 9/1991 | Simpson | 369/37 |
| 5,146,451 | 9/1992 | Kang | 369/270 |
| 5,166,920 | * 11/1992 | Kogure | 369/270 |
| 5,279,097 | 1/1994 | Weisburn et al. | 53/449 |
| 5,323,379 | 6/1994 | Kim | 369/270 |
| 5,646,934 | 7/1997 | Mizuno et al. | 369/290 |
| 5,706,938 | 1/1998 | Niehaus | 206/308.1 |
| 5,751,688 | 5/1998 | Mizuno et al. | 369/270 |
| 5,774,445 | * 6/1998 | Sawi et al. | 369/270 |
| 6,041,033 | * 3/2000 | Otsubo et al. | 369/271 |

FOREIGN PATENT DOCUMENTS

04278253 * 10/1992 (JP).

* cited by examiner

Primary Examiner—Brian E. Miller
Assistant Examiner—Angel Castro
(74) Attorney, Agent, or Firm—Haynes and Boone, L.L.P.

(57) ABSTRACT

A portable computer includes a media module having a support surface. A drive base is movable relative to the support surface. A spindle includes an automatically actuatable clamp device mounted on the drive base. A triggering device is mounted in the spindle and includes a reciprocating member and a rotating cam member, so that movement of the drive base adjacent the support surface moves the reciprocating member to rotate the cam member and actuate the clamp device.

20 Claims, 7 Drawing Sheets

MEDIA RETENTION DEVICE FOR CD ROM AND DIGITAL VIDEO DRIVES IN A PORTABLE COMPUTER

BACKGROUND

The disclosures herein relate generally to portable computers and more particularly to mounting a CD ROM or digital video disk on the player spindle.

One continuing problem for portable computers is keeping media such as a CD ROM or digital video disk mounted on the player spindle while the system is subjected to shock and vibration. Portable compact disc and digital video players have a manual snap-on device to hold the disk on the spindle. If the media does not stay on the spindle, the player will experience read/write failures or, worse, media damage can occur if the media comes into contact with other stationary components inside the player or system. Methods used to hold the disc are limited because of the small size of portable CD ROM and digital video disk players. The entire player is typically 18 mm thick with only 3.75 mm between the bottom of the media disk and the top of the player assembly.

Currently CD ROM and digital video drives for portable computers use a set of spring loaded tabs to hold the media on the drive spindle. These tabs are pressed out of the way by the media as the media is manually pressed onto the tray. These tabs have to be able to allow the user to mount and remove the media while at the same time preventing the media from moving off the spindle during shock and vibration. These are completely passive tabs that are moved by the media itself when the media is inserted or removed from the drive.

This is not a concern in desktop computers. Because of the larger size of desktop computers, there is room to provide a device for positively engaging and retaining the media on the drive spindle. In portable computer however, there is not enough room to provide such a device. As a result, a user of a desktop computer is only required to place the media in the drive bay without concern for positive engagement of the media with the drive spindle. The user may not be aware that the procedure is different in a portable computer, i.e. verified positive media/spindle engagement is required to avoid damage to the media or read/write failures.

Various other disk retention devices have been developed. U.S. Pat. No. 4,841,518 discloses a clamp mechanism for clamping an information recording disk such as a compact disk or a video disk to a turntable despite variations in the thicknesses of the disks to be reproduced. The clamp mechanism includes a damper having a magnet retaining member, a ring-like pressing member arranged to abut the information recording disk, and a plate spring member interconnecting the retaining member and the pressing member in such a manner that the retaining member and the pressing member are vertically movable relative to each other.

U.S. Pat. No. 5,050,148 discloses a compact disc magazine for a jukebox. This device includes an automatic mechanism for engaging a compact disc at generally diametrically opposite points. The disc is removed from a location adjacent to the top of the magazine through the upper front portion thereof in which a hub mounted. This enables movement around a generally horizontal axis having circumferentially spaced disc-receiving grooves, each of which at the removal location is limited to a segment of a disc below and to the rear of a line passing through the points. A belt extends around the lower part of the magazine for retaining discs in the grooves.

U.S. Pat. No. 5,146,451 discloses a compact disk player wherein more compact disks can be loaded within a limited space and can be reproduced continuously. A disk setting device on which the disks are placed is arranged as an up-and-down double structure. The disks laid on the disk setting device are lifted up and lowered in conformity with the heights of a disk chuck, a disk clamp and a pick-up driving part. A height compensating device for compensating addresses the problem of the difference in height of the disk setting device in order to accomplish the proper chucking of the disks and reproduction of material recorded on the disks.

U.S. Pat. No. 5,279,097 discloses a container construction for displaying a compact disc for sale and for subsequent storage thereof after purchase by a consumer. The container comprises a base having a storage compartment, a tray pivotally mounted on the base for releasably holding a compact disc, and a lid pivotally mounted on the base for enclosing the tray and disc within the storage compartment of the base to protect the compact disc when not in use after purchase. A locking mechanism is provided to lock the base, lid and tray in a generally flat extended end-to-end relationship for display with the tray being pivoted into the lid so that the compact disc is secure between the lid and tray.

In U.S. Pat. No. 5,323,379, a disk drive mechanism includes a disk clamping apparatus. The disk clamping apparatus includes a clamp having a plurality of clamp jaws movable horizontally, such that the apparatus is compact. The clamp also includes first and second grooves formed according to central hole sizes of the disks to be accommodated on the turntable so that the clamp can be used for both a compact disk and a laser disk.

U.S. Pat. No. 5,646,934 discloses a clamp mechanism, an adapter, and an optical disc apparatus for compatibly playing back an MD and a CD having different centering hole diameters and reference heights. A first clamp mechanism has a taper cone section for both the MD and CD, while a second clamp mechanism has an MD turntable and a CD clamper which is driven in contact with the MD turntable while clamping the CD. The adapter is a disc which has a hole having the same inner diameter as that of the centering hole of the MD and a thickness of 0.8 mm, the adapter to be attached to the CD. A first optical disc apparatus has an MD spindle motor and a CD spindle motor, and an optical system including an objective lens is arranged on a straight line that connects both spindle motors. A second optical disc apparatus has a spindle motor having an MD turntable and a CD turntable at both its ends.

U.S. Pat. No. 5,706,938 discloses a device for removably receiving a planar object, in particular a CD, fitted with a central round receiving aperture. The device may be a plate comprising a recess to receive the planar object and a central clamp for the round receiving aperture of the planar object. The receiving plate comprises at least on one side, and in the vicinity of its edge, two mutually spaced boreholes for threading or stacking, for instance when using bar-shaped retainers or ring-binders. The boreholes each communicate through a slot of lesser width than the borehole diameters with the side edge of the receiving plate. Incisions are formed on and near both sides of the slots to form resilient wall portions bounding the slots.

U.S. Pat. No. 5,751,688 discloses an optical disc clamp mechanism that is capable of selectively playing back either of a compact disc or a mini disc. The clamp mechanism includes a circular disc receiving section for contacting a reference surface of either of the compact disc or the mini disc and further includes a magnetic clamp unit for clamping the mini disc by magnetic attraction with a magnetically attractable member of the mini disc. A first conical or spherical taper cone portion for engaging the center hole of the mini disc is mounted to the disc receiving section, and a second conical or spherical taper cone portion for engaging the center hole of the compact disc is mounted to the disc receiving section. The first taper cone portion is located inwardly of the second taper cone portion and protrudes form the second taper cone portion in the axial direction. The magnetic clamp unit further includes a stopper element for preventing detachment of the first and second taper cone portions from the disc receiving section. Accordingly, the optical disc clamp mechanism independently affects the centering of a mini disc and a compact disc to allow either of the discs to be centered.

Therefore, what is needed is a device for providing a positive engagement with media such as a CD ROM or a digital video disk, to retain the media on the drive spindle in correct orientation within a portable computer, with a capability of withstanding shock and vibration which may otherwise dislodge the media from the spindle.

SUMMARY

One embodiment accordingly, provides an automatic clamping device which positively engages the media disk during operation and automatically releases the media disk upon movement out of an operating position. To this end, a media retention device includes a movable drive base. A spindle is mounted on the drive base and includes an automatically actuatable clamp device. A triggering device is movably mounted in the spindle, such that movement of the triggering device in the spindle causes the triggering device to actuate the clamp device.

A principal advantage of this embodiment is that when the disk drive door is closed, the automatic clamping device holds the disk on the spindle. When the disk drive door is opened, the media disk is automatically released. The clamping device extends from the spindle and provides a positive hold on the media disk during operation.

DETAILED DESCRIPTION

Figure 1:
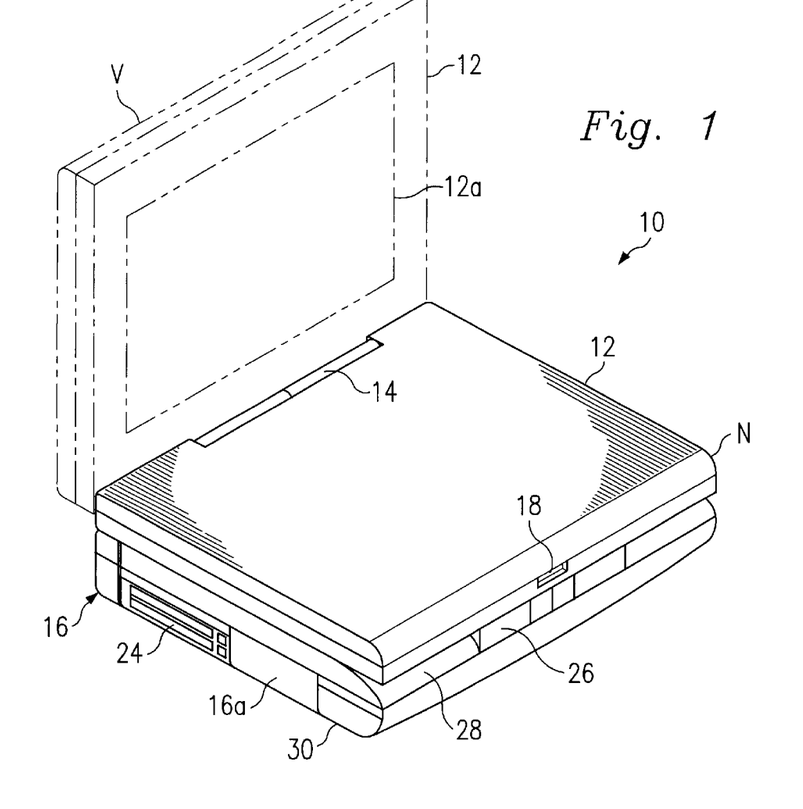
FIG. 1 is an isometric view illustrating an embodiment of a portable computer.
Figure 1A:
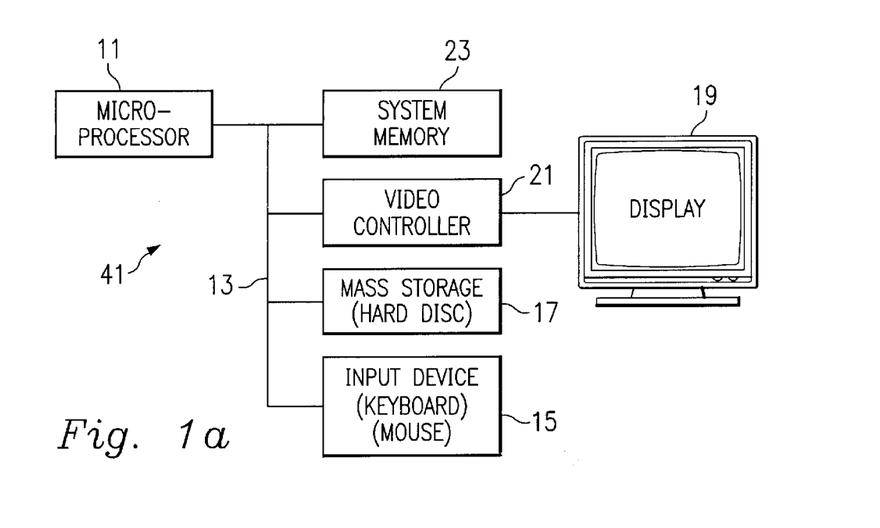
FIG. 1a is a diagrammatic view illustrating an embodiment of a computer system.
Figure 2:
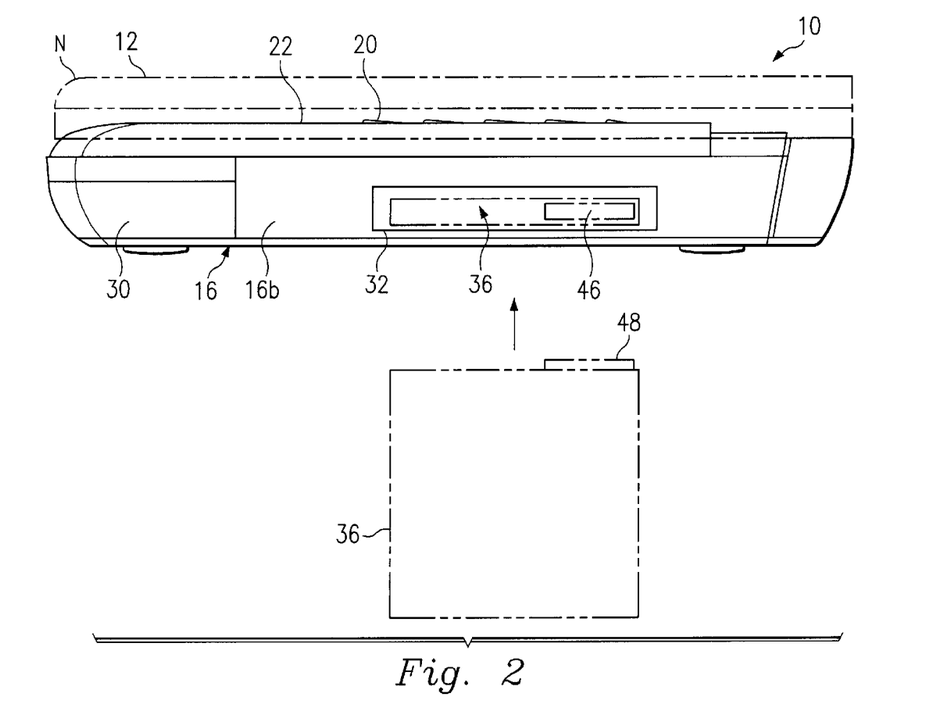
FIG. 2 is a side view of the computer of FIG. 1.

Referring to FIGS. 1 and 2, illustrated is a portable, notebook size computer designated 10 including a self-contained computer system 41, FIG. 1a, and including a hinged top or lid 12 rotatable about a pivotable member 14 from a nested position "N", with a horizontal base 16, to a substantially vertical or open position "V" shown in FIG. 1.

In one embodiment, computer system 41, FIG. 1a, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Opening of the notebook style portable computer by manipulation of a latch 18, reveals a plurality of keys 20, FIGS. 1 and 2, on an exposed horizontal keyboard surface 22 of base 16, and a monitor screen 12a in an exposed portion of lid 12, FIG. 1. Computer 10 also includes a sidewall 16a having plurality of external ports, an exemplary one of which is designated 24. Base 16 may also include a pointing device 26, FIG. 1, such as a track pad, track ball or the like. A palm rest 28 is commonly provided adjacent keyboard surface 22, FIG. 2, which forms an upper surface of a battery housing 30. Housing 16 includes an access slot 32 formed in a sidewall 16b opposite sidewall 16a of housing 16. Slot 32 is generally rectangular, sufficient to receive, for example, a rectangular floppy disc drive module 36, FIGS. 2 and 3. Module 36 includes a connector 48 for making connection with a connector 46 mounted in base 16, and also includes a rotating platter 44 which is insertable in and retractable from the module 36 by means of a moveable drawer 37.

Figure 4:
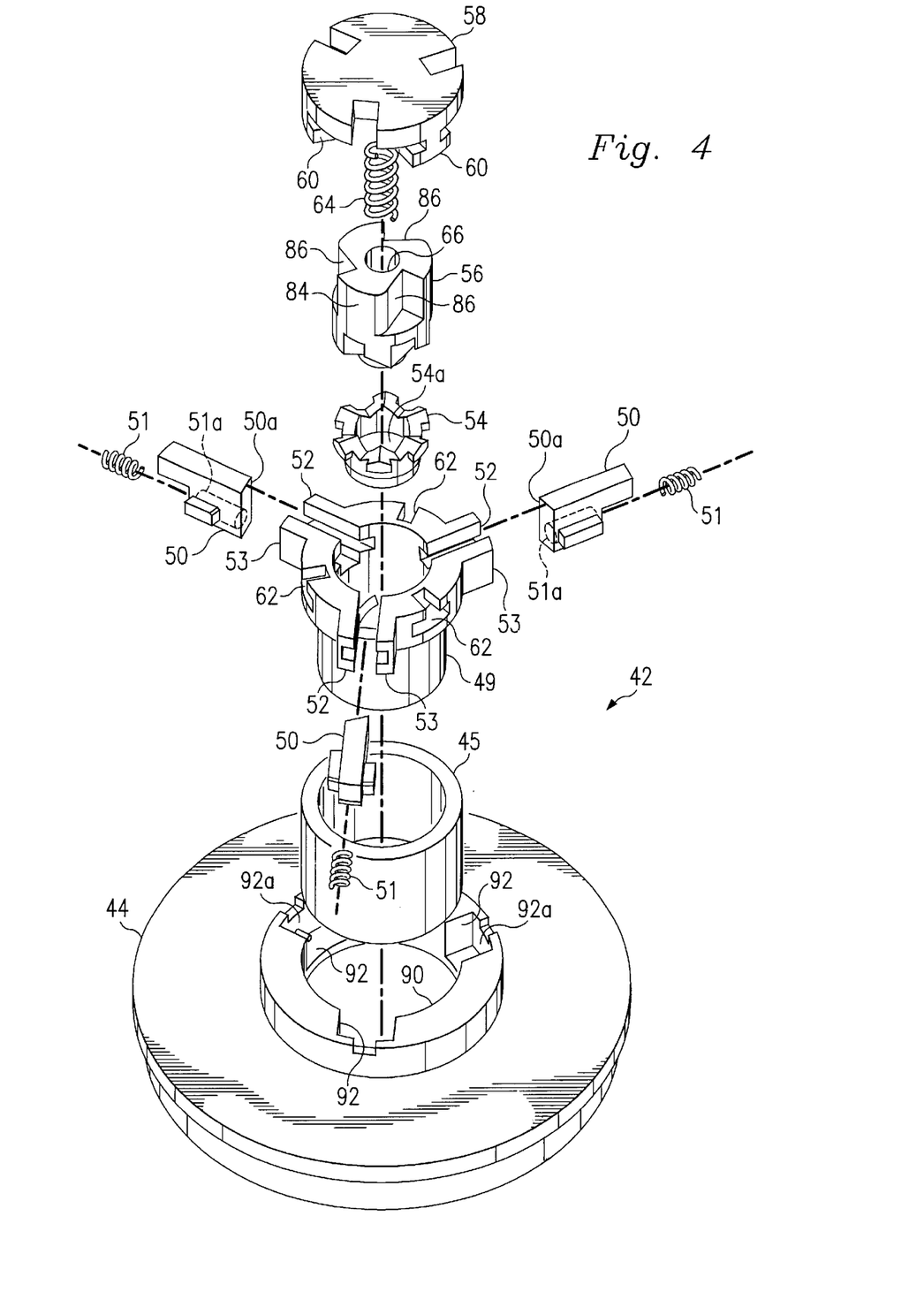
FIG. 4 is an exploded isometric view illustrating an embodiment of an automatic clamping device.

A media retention device, FIG. 4, is generally designated 42 and includes rotating platter 44 which functions as a movable drive base, and a stationary sleeve or bushing 45 mounted therein. A spindle 49 is mounted in bushing 45 and rotates therein with platter 44. Spindle 49 includes an automatically actuatable clamp device including a plurality of slidably mounted clamp members 50 which are resiliently mounted in respective slots 52 formed in clamp mounts 53 of spindle 49. A triggering device is movably mounted by spring members 51 in spindle 49 and includes a reciprocating member 54 and a rotating member 56. The reciprocating member 54 and the rotating member 56 are retained in spindle 49 by a cap 58 which includes tabs 60 engaged in notches 62 formed in spindle 49. A resilient member such as spring 64 extends through an opening 66 in rotating member 56 and is compressed between cap 58 and an inner surface 54a of reciprocating member 54.

Figure 5:
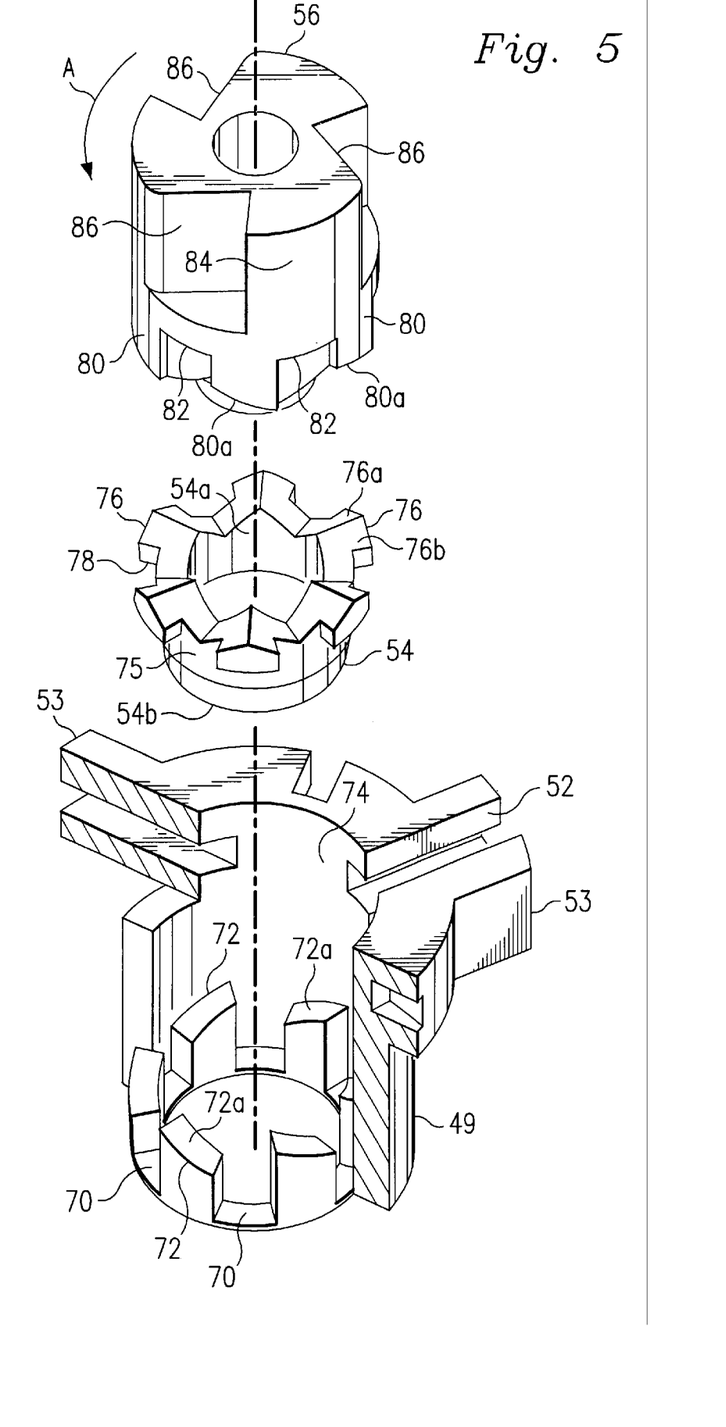
FIG. 5 is an exploded isometric view illustrating a portion of the automatic clamping device of FIG. 4.

In FIG. 5, it can be seen that spindle 49 includes a plurality of slots 70 and lands 72 successively formed on an annular inner surface 74 thereof. Each land 72 includes a terminal angled or slanted surface 72a. Reciprocating member 54 inserts into spindle 49, and includes a plurality of lift members 76 each having a pair of angled or slanted terminal surfaces 76a, 76b. An extended portion 78 of each lift member 76 extends from an annular peripheral surface 75 thereof and reciprocates within slots 70 of spindle 49. Reciprocating member 54 also includes the inner surface 54a as aforesaid and an outer domed surface 54b. Rotating member 56 includes a plurality of leg members 80 and slots 82 successively formed on an annular peripheral surface 84 thereof. Each leg member 80 includes a terminal angled or slanted surface 80a. In addition, rotating member 56 includes a plurality of elongated slots 86 for permitting clamp members 50 to retract therein and for urging clamp members 50 to extend therefrom within slots 52 of spindle 49, as rotating member 56 rotates in spindle 49.

When assembled, FIGS. 4 and 5, bushing 45 inserts into an annular flanged opening 90 of platter 44 including a plurality of clamp mount recesses 92. Spindle 49 seats into bushing 45 such that clamp mounts 53 seat in respective clamp mount recesses 92. Clamp members 50 slidably seat in a respective slot 52 of spindle 49. Each spring member 51 inserts into a respective opening 51a in clamp members 50. Spring members 51 are compressed against a surface 92a of clamp mount recess 92. Reciprocating member 54 is mounted in spindle 49 such that extended portions 78 are mounted for reciprocating in a respective slot 70 of spindle 49. Rotating member 56 seats in spindle 49 such that surfaces 80a are positioned for engagement with surfaces 72a of spindle 49 and surfaces 76a of reciprocating member 54. Surface 84 of rotating member 56 is positioned to engage a surface 50a of each clamp member 50 for retaining the clamp member 50 extended, and slots 86 receive retracted clamp members 50, urged therein by spring 51. Cap 58 is mounted on spindle 49 so that tabs 60 snap into notches 62. This engagement compresses spring member 64 between cap 58 and reciprocating member 54.

Figure 3:
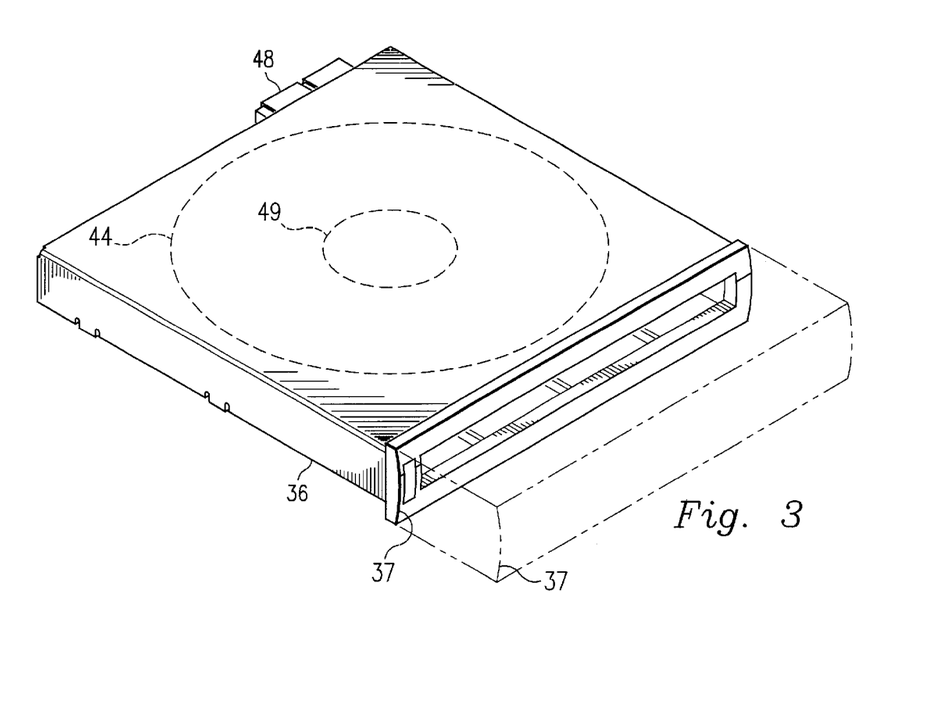
FIG. 3 is an isometric view illustrating an embodiment of a floppy drive module.
Figure 6A:
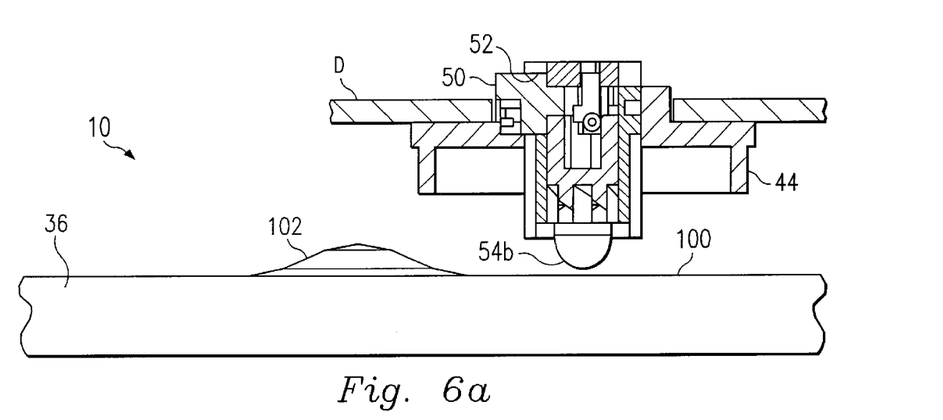
FIGS. 6A–6E are isometric side views partially cut away to illustrate a progressive series of operative positions of the automatic clamping device of FIG. 4.
Figure 6B:
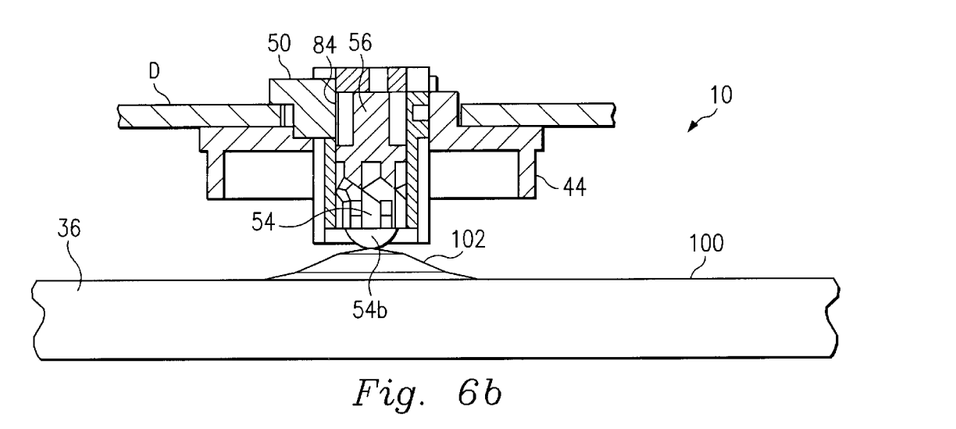
Figure 6C:
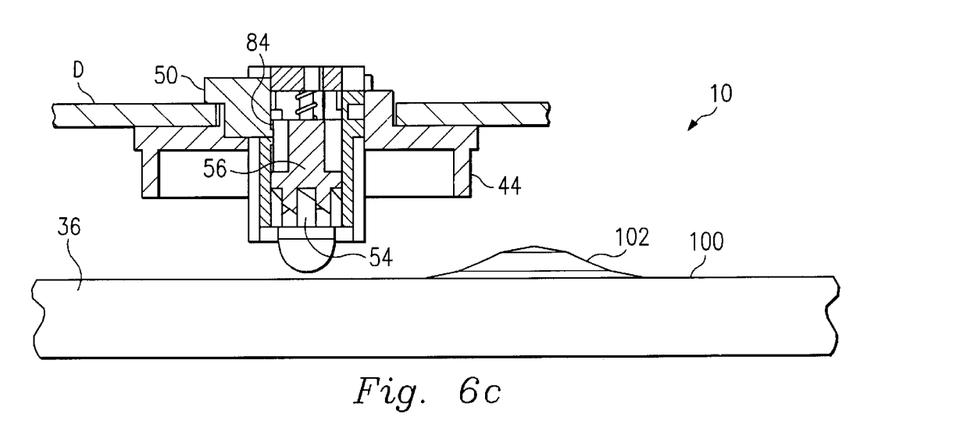
Figure 6D:
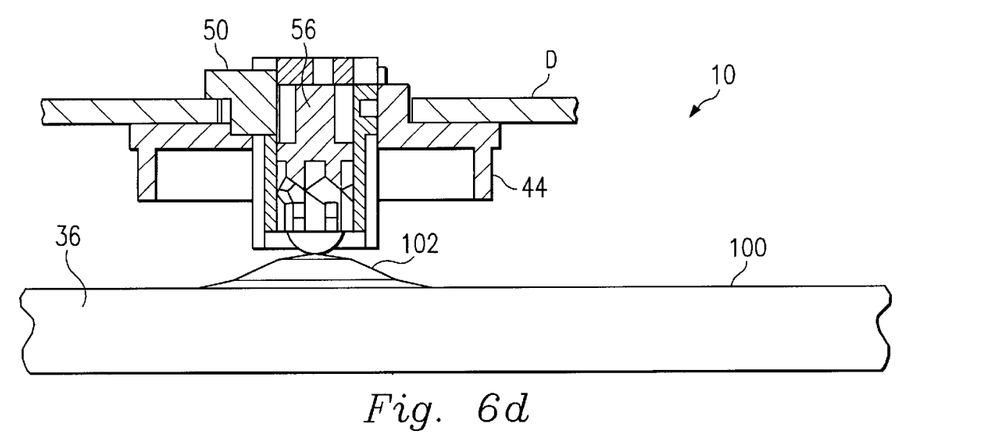
Figure 6E:
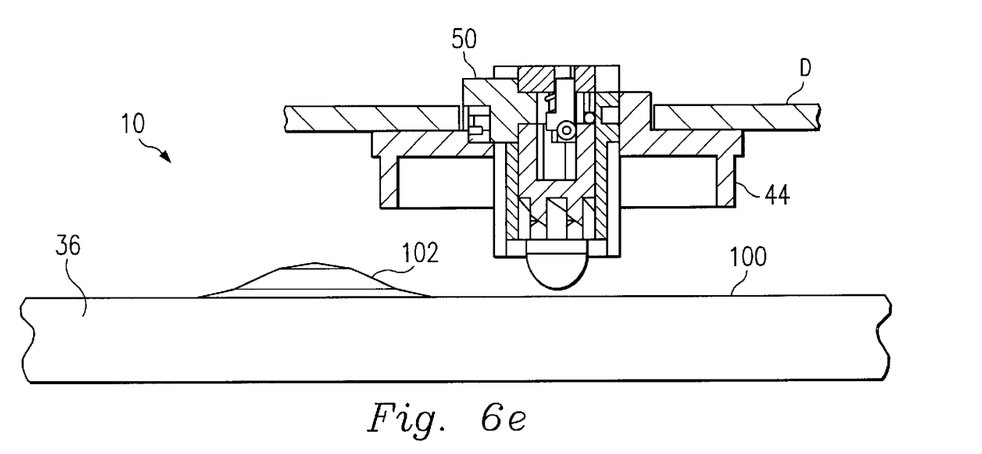
Figure 7A:
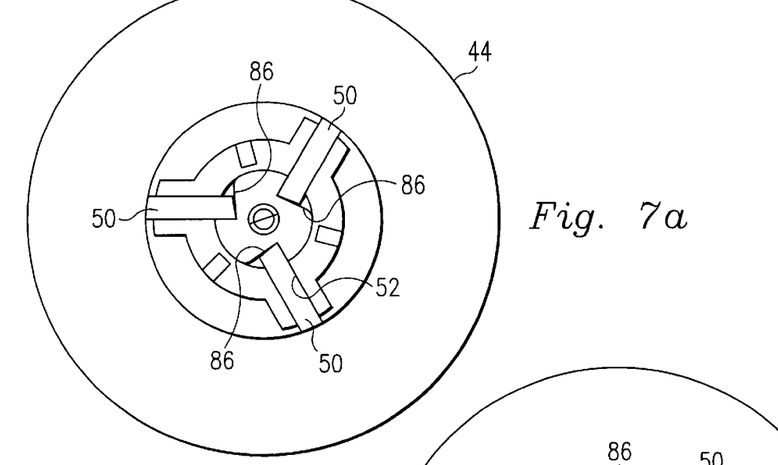
FIGS. 7A–7C are top views illustrating a progressive series of operative positions of the automatic clamping device of FIG. 4.
Figure 7B:
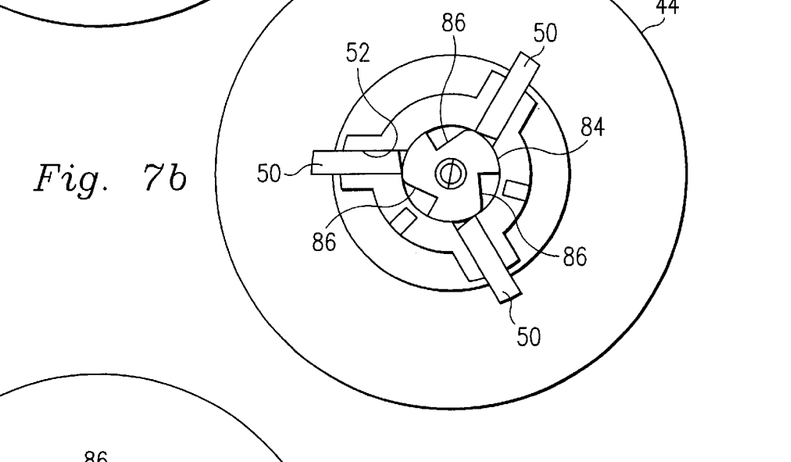
Figure 7C:
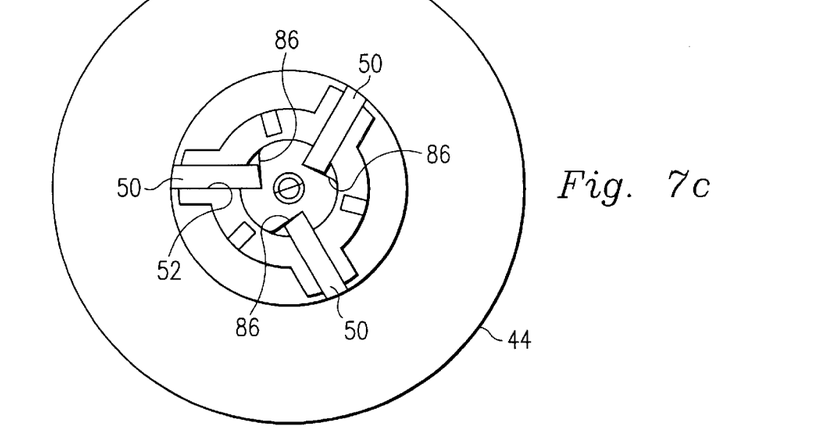

As a result of the foregoing assembly, movable drawer 37 including platter 44, FIGS. 2 and 3, receives a media disk D, FIGS. 6A and 7A. Clamps 50 are retracted via slots 52, into slots 86, FIG. 4, and domed surface 54b is positioned adjacent a support surface 100 in module 36 of portable computer 10, FIG. 6A. A ramp 102 is formed to protrude from surface 100 so that movement of drawer 37 into and out of module 36 will cause domed surface 54b to engage ramp 102, FIG. 6B. As domed surface 54b is urged to reciprocate upward upon engagement with ramp 102, surface 76a of reciprocating member 54, FIG. 5, engages and raises surface 80a of rotating member 56, thus lifting leg members 80 out of their respective slots 70 until surface 80a is positioned to engage surface 72a of land 72. As a result, rotating member 56 is rotatably indexed in a counter-clockwise direction indicated by a directional arrow designated A, FIG. 5, into an adjacent one of the slots 70, and clamp members 50 are urged to extend via slots 52 and are retained in an extended position by engagement with surface 84 of rotating member 56, FIGS. 6C and 7B. In this manner, clamps 50 remain in the extended position as long as drawer 37 is inserted in module 36 and disk D is therefore retained on platter 44. Upon retraction of drawer 37, domed surface 54b engages ramp 102, FIGS. 2–5 and 6D, and surface 76a of reciprocating member 54 engages and raises surface 80a of rotating member 56, again lifting leg members 80 out of their respective slots 70 until surface 80a is positioned to engage surface 72a of land 72. As a result, rotating member 56 is again rotatably indexed in the counter-clockwise direction A, FIG. 5, into an adjacent one of the slots 70, and clamp members 50 are urged to retract by their respective springs 51 to recess into slots 86. As such, the retracted clamp members 50, FIGS. 6E and 7C, permit disk D to be removed from platter 44.

In operation, the automatic clamping device holds the media disk solidly on the spindle while the media drawer is closed. The device automatically clamps the disk as the media drawer is closed, and automatically releases the disk as the drawer is opened. The clamp members extend from the spindle and provide a solid retentive force to retain the media disk on the spindle. The clamp members are activated by the rotating cam device in the spindle. As the drawer is opened, a ramp on the bottom surface of the CD enclosure forces the reciprocating member upwards. This results in an upward movement of the rotating cam member also. The reciprocating member, the rotating cam and the spindle each include cam surfaces (or ramps) which force the rotating cam member to rotate 60° each time the reciprocating member is cycled up and down. The rotating cam member allows the clamp members to retract, permitting the user to place the disk on the spindle. As the drawer is closed, the reciprocating member again cycles through the up and down motion, rotating the cam another 60°. As the rotating cam responds, the clamp members are forced outwardly into a disk retaining position.

As a result, one embodiment provides a media retention device including a movable drive base. A spindle includes an automatically actuatable clamp device mounted on the drive base. A triggering device is movably mounted in the spindle such that movement of the triggering device in the spindle, causes the triggering device to actuate the clamp device.

Another embodiment provides a media module including a support surface and a drive base movable relative to the support surface. A spindle includes an automatically actuatable clamp device mounted on the drive base. A triggering device is mounted in the spindle and includes a reciprocating member and a rotating member, such that movement of the drive base adjacent the support surface causes the triggering device to actuate the clamp device.

Another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. A chassis includes a support surface. A drive base is movably mounted in the chassis for movement relative to the support surface. A spindle includes an automatically actuatable clamp device mounted on the drive base. A triggering device is movably mounted in the spindle, whereby movement of the triggering device in the spindle causes the triggering device to actuate the clamp device.

A further embodiment provides a method for retaining media on a drive spindle including the steps of providing a support surface in a media module mounted in a portable computer, movably mounting a drive base adjacent to the support surface, mounting a spindle including an automatically actuatable clamp device on the drive base, resiliently mounting a triggering device including a reciprocating member and a rotating member in the spindle connected to actuate the clamp device, and mounting the triggering device in the spindle so that movement of the triggering device in the spindle causes the clamp device to be actuated.

As it can be seen, the principal advantages of these embodiments are that when the disk drive door is closed, the automatic clamping device holds the disk on the spindle. When the disk drive door is opened, the media disk is automatically released. The clamping device extends from the spindle and provides a positive hold on the media disk during operation. Therefore, the device provides for a positive engagement with media such as a CD ROM or a digital video disk, to retain the media on the drive spindle in correct orientation within a portable computer, with the capability of withstanding shock and vibration which may otherwise dislodge the media from the spindle.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A media retention device comprising:
    a movable drive base;
    a spindle including an automatically actuatable clamp device mounted on the drive base; and
    a triggering device movably mounted in the spindle, the triggering device including a bi-directional reciprocating member and a uni-directional rotating member which rotates in one direction, whereby movement of the triggering device in the spindle causes the triggering device to actuate the clamp device to thereby retain or release a media.

2. The media retention device as defined in claim 1 wherein the drive base includes a sleeve mounted therein.

3. The media retention device as defined in claim 2 wherein the spindle is mounted in the sleeve.

4. The media retention device as defined in claim 1 wherein the clamp device includes a plurality of slidably mounted clamp members.

5. The media retention device as defined in claim 1 wherein the clamp device includes a plurality of resiliently mounted clamp members.

6. The media retention device as defined in claim 1 wherein the spindle includes a plurality of slots formed therein.

7. The media retention device as defined in claim 6 wherein the spindle includes a clamp member mounted in each slot.

8. The media retention device as defined in claim 7 wherein the clamp members are resiliently mounted in each slot.

9. The media retention device as defined in claim 1 wherein the reciprocating member moves between a raised position and a lowered position for rotating the rotating member.

10. The media retention device as defined in claim 9 wherein the rotating member includes cam surfaces for actuating the clamp device.

11. The media retention device as defined in claim 10 wherein the reciprocating member includes cam surfaces engaged with the rotating member.

12. The media retention device as defined in claim 9 further comprising a cap member engaged with the spindle.

13. The media retention device as defined in claim 12 wherein the cap member retains the reciprocating member and the rotating member in the spindle.

14. The media retention device as defined in claim 13 further comprising a resilient member compressed between the cap member and the reciprocating member.

15. The media retention device as defined in claim 1 wherein the clamp device includes a plurality of slidable members each being resiliently mounted in a respective slot in the spindle.

16. The media retention device as defined in claim 15 wherein the slidable members are actuated for reciprocating movement by a rotating member including a cam surface.

17. The media retention device as defined in claim 16 wherein the rotating member is actuated by a reciprocating member resiliently mounted in the spindle and including a cam surface engaged with the rotating member.

18. A media module comprising:
    a support surface including a ramp thereon;
    a drive base movable relative to the support surface;
    a spindle including an automatically actuatable clamp device mounted on the drive base; and
    a triggering device mounted in the spindle and including a bi-directional reciprocating member and a uni-directional rotating member, whereby movement of the drive base adjacent the support surface causes the triggering device to engage the ramp and actuate the clamp device to thereby retain or release a media.

19. A computer system comprising:
    a chassis;
    a microprocessor in the chassis;
    an input device coupled to provide input to the microprocessor;
    a mass storage coupled to the microprocessor;
    a video controller coupled to the microprocessor;
    a memory coupled to provide storage to facilitate execution of computer programs by the microprocessor;
    a support surface in the chassis;
    a drive base movable relative to the support surface;
    a spindle including an automatically actuatable clamp device mounted on the drive base; and
    a triggering device movably mounted in the spindle, the triggering device including a bi-directional reciprocating member and a uni-directional rotating member, whereby movement of the triggering device in the spindle causes the triggering device to actuate the clamp device to thereby retain or release a media.

20. A method for retaining media on a drive spindle comprising the steps of:
    providing a support surface in a media module mounted in a portable computer;
    movably mounting a drive base adjacent to the support surface;
    mounting a spindle including an automatically actuatable clamp device on the drive base;
    resiliently mounting a triggering device including a bi-directional reciprocating member and a uni-directional rotating member in the spindle connected to actuate the clamp device; and
    mounting the triggering device in the spindle so that movement of the triggering device in the spindle causes the triggering device to actuate the clamp device thus retaining or releasing the media.

* * * * *